Patented Feb. 13, 1951

2,541,408

UNITED STATES PATENT OFFICE 2,541,408

CATALYTIC CHLOROMETHYLATION OF AROMATIC COMPOUNDS

Frank O. Cockerille, Greenwood, Va., assignor to Ciba Pharmaceutical Products, Incorporated, Summit, N. J., a corporation of New Jersey No Drawing. Application November 8, 1946, Serial No. 708,811

6 Claims. (Cl. 260—345)

The present invention relates to the catalytic chloromethylation of aromatic compounds.

Chloromethylation, i. e. the replacement of a hydrogen atom by a chloromethyl group, is a known reaction. A commonly followed method involves the use of formaldehyde and hydrogen chloride in the presence of a condensing agent such as zinc chloride, as exemplified by the following reaction showing the chloromethylation of benzene:

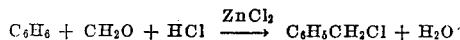
$$C_6H_6 + CH_2O + HCl \xrightarrow{ZnCl_2} C_6H_5CH_2Cl + H_2O$$

The reaction is not, however, without its difficulties and many variations have heretofore been proposed in an effort to suppress side reactions whereby the formation of resinous and/or other by-products, which interfere with the further manipulation of the chloromethylated product and which seriously prejudice the yield, is minimized.

This side reaction difficulty is generally recognized in the art. Thus, Fuson et al., in their treatise on the "Chloromethylation of Aromatic Compounds" (page 63 et seq. of vol. 1 of "Organic Reactions," edited by Roger Adams et al., 1942, John Wiley & Sons, Inc., New York) state:

"The most important side reaction is that leading to the formation of the corresponding diarylmethane derivative. Highly reactive compounds of many sorts—naphthalene, anisole, phenols, polymethylbenzenes, etc.—tend to yield this type of product, and it is often difficult or impossible to isolate the intermediate chloromethyl derivative."

Also, for example, according to U. S. Patent No. 2,219,873, it is proposed to avoid the formation of a difficultly separable mixture of unconverted original aromatic hydrocarbon, monochloromethyl derivative and dichloromethyl derivative, by the employment of an excess of hydrocarbon in the chloromethylation reaction.

Generally speaking, prior chloromethylation methods have required conditions (stringent condensing agents or catalysts, elevated temperatures, etc.) which have favored side reactions and have resulted in correspondingly impaired yields. Moreover, according to many prior methods it is necessary repeatedly to reconstitute the entire reaction mixture with consequent waste or regeneration of unused reactants such as excess hydrogen chloride, formaldehyde and condensing agent.

A primary object of the present invention is the realization of a method for effecting the chloromethylation of the more reactive aromatic compounds in a manner essentially to avoid the formation of diarylmethane derivatives and/or resinous by-products.

A further object of the invention is the embodiment of a chloromethylation process, with the aid of paraformaldehyde and gaseous hydrogen chloride, which results in a product which is directly capable of conversion into desired conversion products. It may be noted that chloromethylation is of particular value in synthetic work inasmuch as the —CH2Cl group can be converted into other groups such as —CH2OH, —CHO, —CH3 and —CH2CN.

An important aspect of the present invention is the chloromethylation of naphthalene in a manner to produce a crude α-chloromethylnaphthalene which may be further processed without intervening purification to yield crude α-naphthyl acetonitrile and crude α-naphthyl acetic acid from which a good grade of refined product can be obtained by simple means.

A further object of the invention is the provision of a catalyst for the chloromethylation of aromatic compounds with the aid of paraformaldehyde and gaseous hydrogen chloride, which catalyst does not promote—if anything, rather inhibits—the formation of undesired by-products.

Another important object of this invention is the embodiment of a process which avoids the necessity of repeated reconstitution of the entire reaction mixture, thereby avoiding waste of reactants. The reaction mass, following completion of the reaction, comprises an aqueous layer and an oily layer, the latter containing the desired chloromethylation product.

The aqueous layer which, according to the invention, may be repeatedly re-used, i. e. returned to process, contains an amount of HCl and HCHO which may actually be in excess of that consumed in the process. The bulk of the catalyst also remains in this aqueous layer, only small amounts being removed with the product. Returning this aqueous layer to process, after compensating only for used reactants, thus effects a considerable economy and also solves a disposal problem. The composition of the said aqueous layer will be essentially constant for any given combination of reaction conditions, such as ratio of reactants, ratio of catalyst to reactants, and time and temperature conditions. In the following, the expression "equilibrium amounts" is used to denote this reproducibility of the composition of the aqueous layer.

Still further objects of the invention are to shorten the reaction time and to avoid the use of large quantities of catalyst.

These objects are realized according to the present invention which, briefly stated, comprises efficient stirring of the aromatic compound which is to be chloromethylated, with a concentrated aqueous solution of hydrogen chloride and formaldehyde containing small amounts of catalyst (as hereinafter set forth). It may be noted at this point that an important characteristic of the invention is the presence, at every stage of the process, of an aqueous phase of considerable volume. As afore-indicated, after the chloromethylation has been effected, the reaction mass comprises an aqueous layer—of considerable volume—and an oily layer. These are separated and the aqueous layer re-used by adding to it a fresh increment of aromatic compound together with a substantially stoichiometric increment of paraformaldehyde and a small increment of catalyst, these being stirred together efficiently while substantially the stoichiometric amount of hydrogen chloride (gas) is passed in during a suitable interval of time and under suitable temperature conditions. The formed aqueous and oily layers are separated, the former returned to process after the incorporation of additaments as aforesaid, and the oily layer treated for recovery of the chloromethylation product. The procedure is then continuously repeated.

Since water is a product of the chloromethylation reaction, there is some increase in the mass of the aqueous layer with each successive run. It is therefore desirable periodically to discard a portion of the aqueous layer to keep the volume thereof from becoming unduly large, an essentially constant volume magnitude being preferred.

The catalyst employed, according to the invention, is preferably arsenic trioxide or arsenic trichloride. It has been found that neither of these compounds promotes the undesired secondary reactions whereby diarylmethane derivatives and/or resinous by-products are produced. Moreover, these compounds are much more active in selectively promoting the formation of α-chloromethyl derivatives than are previously used promoter substances, such as sulfuric acid or zinc chloride, and therefore a relatively lower catalyst concentration will suffice. It is also possible to avoid the use of unduly elevated temperatures, so that temperatures essentially below 100° C. may be employed. The essential absence of undesired by-products greatly facilitates the further working up of the reaction products. In general, it is preferred to use only so much catalyst as is required to complete the reaction in about 6 to 8 hours. The reaction is carried out in such manner that the reaction medium remains at all times sufficiently fluid to permit efficient mixing of the organic and inorganic materials employed.

Efficient stirring or mixing is of the essence for the purposes of the present invention. On the one hand, this promotes the necessary contact between the two essentially incompatible phases which are involved and, on the other hand, it assures the requisite intimate contact between the incoming hydrogen chloride and the aqueous phase whereby dissolution of the gas is effectually realized.

The invention may be applied to a wide range of aromatic compounds, carbocyclic as well as heterocyclic, although as aforesaid it is particularly useful as applied to naphthalene for the ultimate production of α-naphthyl acetic acid. Illustrative of the aromatic compounds which may thus be chloromethylated are benzene and related compounds such as toluene, xylene, cymene, mesitylene, biphenyl and hydrindene, naphthalene and related compounds such as the alkyl-substituted naphthalenes, tetralin, acenaphthene and anthracene, phenanthrene and related compounds, phenols and naphthols and related compounds such as cresol, α- and β-naphthols, anisoles and the like, heterocyclic compounds such as thiophene, furan, pyrrole and related compounds.

A feature of the present invention is the possibility of realizing the desired results while using a very small ratio of catalyst to aromatic compound to be chloromethylated. Heretofore, where reaction assistants such as condensing agents—for example, sulfuric acid—have been employed in this type of reaction, a high ratio of catalyst to aromatic compound has been necessary. Thus, a ratio for example of sulfuric acid to naphthalene of 1:1 to by weight, was not at all unusual. In contradistinction hereto, the present invention makes it possible to use a catalyst-aromatic compound ratio which is as small as 1:450 by weight or even smaller.

The following examples illustrate the invention, but they are not intended to define its limits. Parts are by weight unless otherwise stated.

Example 1

100 parts of naphthalene, 60 parts of paraformaldehyde, 240 parts of concentrated hydrochloric acid (sp. gr. 1.18), and 3 parts of arsenic trichloride (or 1.6 parts of arsenic trioxide) are placed together in a glass or glass-lined vessel in which no metal surface is exposed. The mixture is thoroughly stirred while the temperature is adjusted to between 30 and 40° C. The stirring is then continued while gaseous hydrogen chloride is passed in at such a rate that all is absorbed. The temperature is raised gradually during the passage of the gas until at the end of 4 hours the mixture is at about 75° C., and at the end of 6 hours is at about 90° C. Passage of gas is continued at a very slow rate while a temperature range of 90°–95° C. is maintained. The mixture is then cooled and the resultant oily layer separated from the formed aqueous layer and removed to another vessel, while avoiding all contact thereof with metal. The oily layer comprises 133 parts, of which 102 parts are α-chloromethylnaphthalene, 10 parts are dichloromethylnaphthalene, 20 parts are unchanged naphthalene, and 1 part is non-volatile residue. The α-chloromethylnaphthalene (M. P. about 33° C., B. P. about 130° C. under a pressure of 2 mm. of mercury) may be recovered by fractional distillation.

Example 2

(This example illustrates the re-use of the aqueous layer.)

100 parts of naphthalene, 25 parts of paraformaldehyde, 1 part of arsenic trichloride, and 250 parts of the aqueous layer from a previous charge (according to Example 1) are thoroughly stirred in an all-glass vessel while the temperature is brought to about 30–40° C. The temperature is scheduled essentially as in Example 1 while a total of 30 parts of gaseous hydrogen chloride is passed in, rapidly at first, then more slowly as the mixture nears saturation, the intimate stirring being continued. The product is entirely similar to that obtained in Example 1.

Example 3

One part of arsenic trichloride, 30 parts of paraformaldehyde and 112 parts of furoic acid are added to 250 parts of the aqueous layer from a previous charge. The mixture is stirred vigorously and maintained at a temperature of 25 to 30° C. while 37 parts of hydrogen chloride are passed in over a period of six hours. The temperature is allowed to rise to 50° C. during the next two hours, while stirring is continued. The sharply crystalline chloromethylfuroic acid is separated with the aid of a glass filter, rinsed with water, then with dilute sodium benzoate, and again with water. The object of the sodium benzoate, only a small amount of which need be used, is to destroy traces of mineral acidity which might cause gradual decomposition of the chloromethylfuroic acid.

Having thus disclosed the invention, what is claimed is:

1. The monochloromethylation of an aromatic compound with gaseous hydrogen chloride and paraformaldehyde in essentially stoichiometric proportions, in an aqueous medium containing a catalytic amount of a catalyst selected from the class consisting of arsenic trioxide and arsenic trichloride at a temperature below 100° C. while maintaining the reaction mass out of contact with metal, the volume of the aqueous phase being of such magnitude as to provide a medium which remains at all times sufficiently fluid to permit efficient stirring of the reaction mixture, whereby the formation of diarylmethane derivatives and resinous by-products is essentially avoided.

2. The monochloromethylation of naphthalene with gaseous hydrogen chloride and paraformaldehyde in essentially stoichiometric proportions, in an aqueous medium containing a catalytic amount of arsenic trioxide, as catalyst, at a temperature below 100° C. while maintaining the reaction mass out of contact with metal, the volume of the aqueous phase being of such magnitude as to provide a medium which remains at all times sufficiently fluid to permit efficient stirring of the reaction mixture, whereby the formation of undesired by-products is essentially avoided.

3. The monochloromethylation of naphthalene with gaseous hydrogen chloride and paraformaldehyde in essentially stoichiometric proportions, in an aqueous medium containing, as catalyst, a catalytic quantity of arsenic trichloride, at a temperature below 100° C. while maintaining the reaction mass out of contact with metal, the volume of the aqueous phase being of such magnitude as to provide a medium which remains at all times sufficiently fluid to permit efficient stirring of the reaction mixture, whereby the formation of undesired by-products is essentially avoided.

4. The monochloromethylation of furoic acid with gaseous hydrogen chloride and paraformaldehyde in essentially stoichiometric proportions, in an aqueous medium containing a catalytic amount of an arsenic trichloride, as catalyst, at a temperature below 100° C. while maintaining the reaction mass out of contact with metal, the volume of the aqueous phase being of such magnitude as to provide a medium which remains at all times sufficiently fluid to permit efficient stirring of the reaction mixture, whereby the formation of undesired by-products is essentially avoided.

5. The monochloromethylation of an aromatic compound with gaseous hydrogen chloride and paraformaldehyde in essentially stoichiometric proportions, in an aqueous phase which contains equilibrium amounts of dissolved hydrogen chloride, paraformaldehyde and catalyst, the catalyst being selected from the class consisting of arsenic trioxide and arsenic trichloride at a temperature below 100° C. while maintaining the reaction mass out of contact with metal, the volume of the aqueous phase being of such magnitude as to provide a medium which remains at all times sufficiently fluid to permit efficient stirring of the reaction mixture, whereby the formation of diarylmethane derivatives and resinous by-products is essentially avoided.

6. A process for the monochloromethylation of an aromatic compound which comprises reacting the said aromatic compound with gaseous hydrogen chloride and paraformaldehyde in essentially stoichiometric proportions, in an aqueous medium containing a catalytic amount of a catalyst selected from the class consisting of arsenic trioxide and arsenic trichloride at a temperature below 100° C. while maintaining the reaction mass out of contact with metal, the volume of the aqueous phase being of such magnitude as to provide a medium which remains at all times sufficiently fluid to permit efficient stirring of the reaction mixture, whereby the formation of diarylmethane derivatives and resinous by-products is essentially avoided, separating the resultant oily phase which contains chloromethylated products from the aqueous phase which contains equilibrium amounts of dissolved hydrogen chloride, paraformaldehyde and catalyst, and returning the said aqueous phase, after compensating for consumed quantities of reactants, for reaction with fresh aromatic compound to be chloromethylated.

FRANK O. COCKERILLE.

REFERENCES CITED

The following references are of record in the file of this patent:

UNITED STATES PATENTS

| Number | Name | Date |
| --- | --- | --- |
| 1,727,682 | Tschunkur et al. | Sept. 10, 1929 |
| 2,219,873 | Pinkernelle | Oct. 29, 1940 |
| 2,434,289 | Schmerling | Jan. 13, 1948 |

FOREIGN PATENTS

| Number | Country | Date |
| --- | --- | --- |
| 403,264 | Germany | Sept. 25, 1924 |
| 492,021 | France | June 26, 1919 |

OTHER REFERENCES

Adams: "Organic Reactions," vol. I, pages 64–73 (1942).